(12) United States Patent
Urquhart

(10) Patent No.: US 9,251,191 B2
(45) Date of Patent: Feb. 2, 2016

(54) SYSTEM AND METHOD FOR INDEXING OF GEOSPATIAL DATA USING THREE-DIMENSIONAL CARTESIAN SPACE

(71) Applicant: Raytheon Company, Waltham, MA (US)

(72) Inventor: Andrew L. Urquhart, Wylie, TX (US)

(73) Assignee: Raytheon Company, Waltham, MA (US)

(*) Notice: Subject to any disclaimer, the term of this patent is extended or adjusted under 35 U.S.C. 154(b) by 426 days.

(21) Appl. No.: 13/791,275

(22) Filed: Mar. 8, 2013

(65) Prior Publication Data

US 2013/0238632 A1    Sep. 12, 2013

Related U.S. Application Data

(60) Provisional application No. 61/608,991, filed on Mar. 9, 2012.

(51) Int. Cl.
*G06F 17/30* (2006.01)

(52) U.S. Cl.
CPC ...... *G06F 17/3033* (2013.01); *G06F 17/30241* (2013.01)

(58) Field of Classification Search
None
See application file for complete search history.

(56) References Cited

U.S. PATENT DOCUMENTS 6,263,334 B1 *    7/2001    Fayyad et al. ................. 707/737

OTHER PUBLICATIONS

Fogel, Efi, "Minkowski sum construction and other applications of arrangements of geodesic arcs on the sphere," Tel Aviv University, The Blavatnik School of Computer Science, Thesis submitted for the degree of PhD, Jun. 2009.*

* cited by examiner

*Primary Examiner* — Jay Morrison
(74) *Attorney, Agent, or Firm* — Schwegman Lundberg & Woessner, P.A.

(57) ABSTRACT

Embodiments of a system and method for indexing of geospatial data using three-dimensional Cartesian space are generally described herein. In an aspect, such example methods may include calculating endpoints of a segment, wherein the endpoints are specified in Cartesian coordinates and are located on a substantially spherical surface, defining a boundary of a polygon according to the segment, computing one or more normals corresponding to one or more planes, wherein each of the one or more planes contain a test point and a boundary point associated with the boundary, obtaining a boundary sine value of an angle defined by an arc subtended by the endpoints, summing each of a group of angle values derived from the boundary sine value to obtain an angle sum, wherein the group contains the boundary sine value, and determining whether the test point is inside the polygon based on the angle sum.

17 Claims, 4 Drawing Sheets

SYSTEM AND METHOD FOR INDEXING OF GEOSPATIAL DATA USING THREE-DIMENSIONAL CARTESIAN SPACE

CLAIM OF PRIORITY 35 U.S.C. §119

The present non-provisional utility patent application hereby claims priority under 35 U.S.C. §119 to U.S. Provisional Application No. 61/608,991, entitled "System and Method for Indexing of Geospatial Data Using Three-Dimensional Cartesian Space" and filed on Mar. 9, 2012.

GOVERNMENT RIGHTS

This invention was made with Government support under Contract Number 09-C-4135 awarded by Department of Defense. The Government has certain rights in this invention.

TECHNICAL FIELD

Embodiments pertain to indexing of geospatial data using three-dimensional Cartesian space.

BACKGROUND

Some conventional databases include geospatial search support based on a two-dimensional model based on latitudes and longitudes. Consequentially, such models exhibit degraded geospatial accuracy at the North and South Poles and at the 180-degree East/West meridian lines. Thus, methods and apparatuses for geospatial search and indexing are needed that help obviate accuracy degradation at certain areas of the Earth.

DETAILED DESCRIPTION

Figure 1:
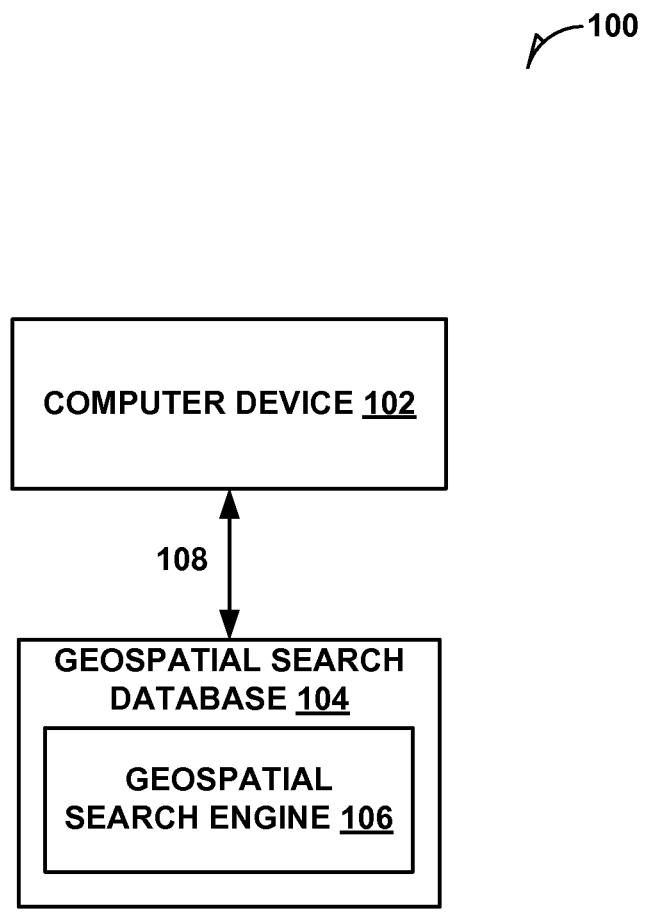
FIG. 1 is a schematic diagram illustrating a system for improved geospatial search, according to an example embodiment.

The following description sufficiently illustrates specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In accordance with embodiments, the system and method disclosed herein indexes data geospatially by use of a space-filling curve with boundaries and boundary intersections calculated in three-dimensional Cartesian space so that the North and South poles and 180-degree East/West meridian are non-issues.

Some embodiments employ a modification of the open-source GeoHash indexing concept. One key part is how polygons and areas of the sphere are bounded in three-dimensional space. This may be done by calculating the endpoints of polygon bounding segments as points on the spherical surface and then using the chord through the sphere as the boundary (instead of Great Arcs). Intersections are found as closest-approaches with linear-algebraic calculations finding the distances along the boundary segments of the closest-approach points and the distance of the closest approach along a third orthogonal direction.

In some embodiments, an innovative algorithm may be used to determine if a test point is inside or outside of a polygon. The algorithm may use cross-products to define the normal to planes containing the test point and each point of the boundary. The algorithm may then use cross-products of these normals to find the sine of the arc subtended by the boundary segments. Finally, from the sine of the arc it derives the angles subtended by the boundary segments to determine whether or not the test point is inside or outside the polygon.

Some embodiments use Cartesian coordinates, straight-line spherical-chord boundaries, and linear algebra to find Great Arc boundary intersections rather than the direct Great Arcs and spherical trigonometry to find the intersections. As a consequence of this approach, coordinate system special points such as the North and South Poles and the 180-degree East/West line become like every other point on the spherical surface.

In some embodiments, a geospatial search approach is provided that supports geospatial search with polygon bounds. By switching to three-dimensional coordinates, the poles and the 180-degree East/West meridian become non-issues. In accordance with embodiments, a geospatial search capability is provided that has the ability to search for documents within a geospatial polygon, and provides a solution that would not require special handling at any point on the Earth specifically including the poles and the 180-degree East/West longitude meridian. Some embodiments may internally map latitude/longitude points onto a spherical Earth and then operates in three-dimensional Cartesian space. Using the geohash algorithm modified to produce Long indices (or, in some examples, integer indices, which in some programming languages, may have unlimited size) the approximate locations of points are indexed as numeric values. This approach helps enable index lookup using Trie structures with numeric range queries. Polygons may be enabled by making the index field multi-valued.

In some embodiments, after the index lookup, the results may be filtered with the query polygon, although the scope of the embodiments is not limited in this respect. These embodiments enable the use of coarser index lookups to reduce the number of Boolean clauses required. The document geometry information may be stored to enable this filtering. In some other embodiments, core mathematics discussed herein may be used in the indexing and querying processes described.

Turning to the figures, FIG. 1 represents an example system 100 for geospatial search based on three-dimensional Cartesian coordinate indexing of points on a substantially spherical body, such as, but not limited to, the Earth. In an aspect, system 100 may include a computer device 102, which may be configured to communicate with a geospatial search database 104 via a communication link 108. In some examples, a user may input a search query into computer device 102 via an input method (e.g., a keyboard, not shown). Computer device 102 may format the query for communication to geospatial search database 104 and may transmit this formatted query to geospatial search database 104. In a further aspect, geospatial search database 104 may include a geospatial search engine 106, which may be configured to receive one or more queries and/or execute one or more algorithms to perform a search based on the query using mathematical algorithms defined herein, which may be based upon three-dimensional modeling of a surface, such as, but not limited to, the surface of the earth. Furthermore, geo spatial search engine 106 and/or geospatial search database 104 may be configured to generate and transmit a query response to computer device 102 via communication link 108.

In an aspect, one or both of computer device 102 and geo spatial search database 104 may be a stationary computer device, such as, but not limited to a desktop computer, server, server rack, supercomputer, a group thereof, or the like. Further, may be a mobile device, such as, but not limited to, a smartphone, cellular telephone, mobile phone, laptop computer, tablet computer, or other portable networked device. In addition, one or both of computer device 102 and geo spatial search database 104 may also be a mobile device, which may be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, one or both of computer device 102 and geo spatial search database 104 may be small and light enough to be considered portable and may be configured to communicate wirelessly via an over-the-air communication link using one or more OTA communication protocols described herein.

Furthermore, communication link 108 (or one or both of computer device 102 and geospatial search database 104) may include one or more of any type of network module, such as an access point, a macro cell, including a base station (BS), node B, eNodeB (eNB), a relay, a peer-to-peer device, an authentication, authorization and accounting (AAA) server, a mobile switching center (MSC), a radio network controller (RNC), or a low-power access point, such as a picocell, femtocell, microcell, etc.

Furthermore, in an additional aspect, both of computer device 102 and geospatial search database 104 may be components of a single device (e.g. a unitary computing device). In such an aspect, communications link 108 may be internal to such a unitary computing device and may therefore comprise, for example, a bus or other information-carrying conductor on an integrated circuit or between components of the unitary computing device.

Figure 2:
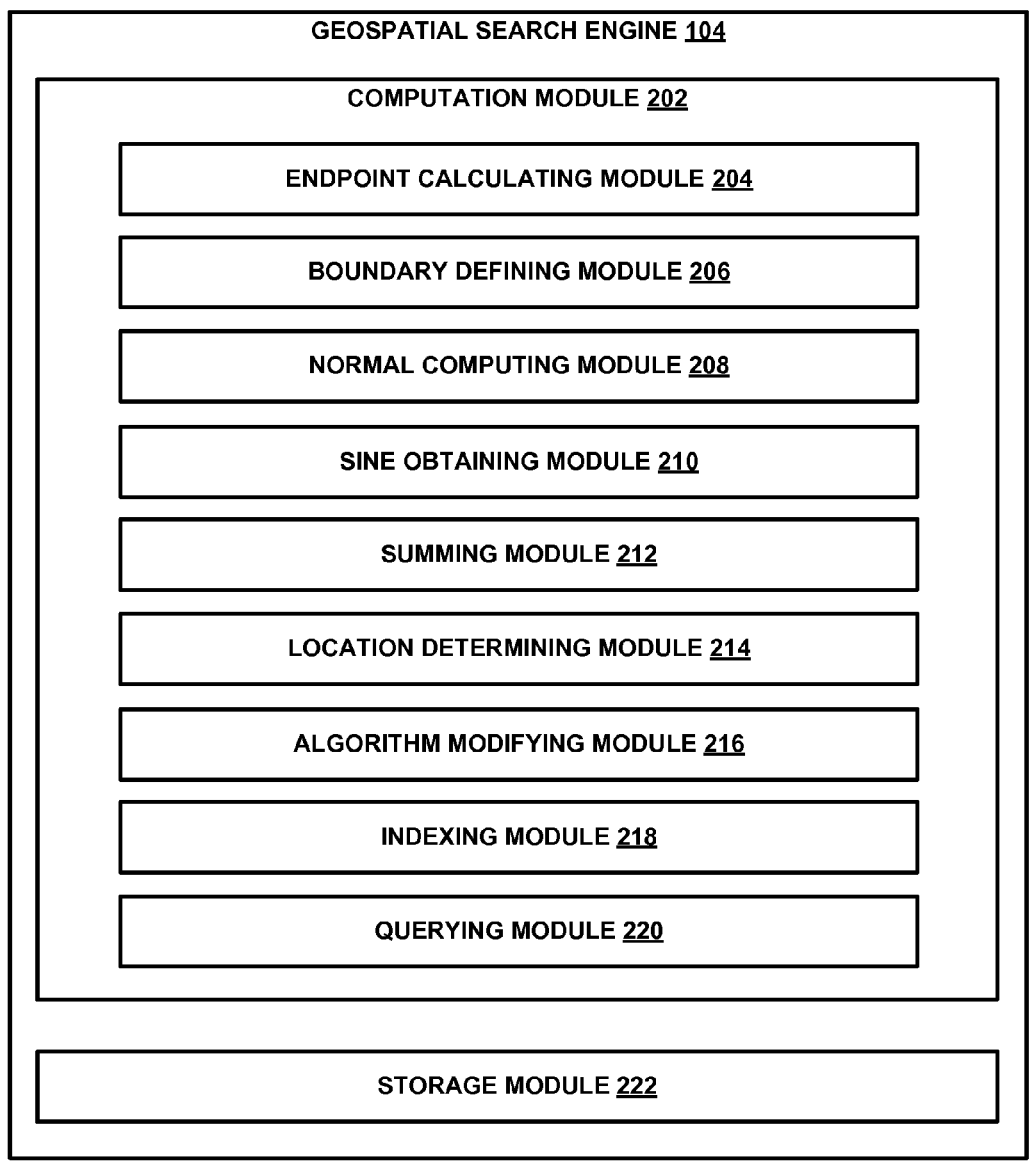
FIG. 2 is a block diagram illustrating an example geospatial search engine, according to an example embodiment.

In addition, FIG. 2 presents an example geospatial search engine 104, which, as indicated in FIG. 1, may be configured to perform mathematical algorithms to effect three-dimensional Cartesian-based geospatial searching based on one or more queries. Geospatial search module 202 may include an endpoint calculating module 204, which may be configured to calculate endpoints of a segment. In an aspect, this segment may be specified in Cartesian coordinates and are located on a substantially spherical surface, and may be based on an input from a user and/or a surface polygon defined by the input or other search instructions.

Furthermore, computation module 202 may include a boundary defining module configured to define a boundary of a polygon according to the segment. Additionally, computation module 202 may include a normal computing module configured to compute one or more normals corresponding to one or more planes. In some examples, each of the one or more planes contain a test point and a boundary point associated with the boundary. In an additional aspect, computation module 202 may include a sine obtaining module configured to obtain a boundary sine value of an angle defined by an arc subtended by the endpoints and/or a summing module configured to sum each of a group of angle values derived from the boundary sine value to obtain an angle sum. In some examples, such a group of angle values derived from the boundary sine value may contain the boundary sine value.

Additionally, computation module 202 may include a location determining module configured to determine whether the test point is inside the polygon. In an aspect, such a determination may be based on the angle sum. Furthermore, computation module may include an algorithm modifying module configured to modify a geohash algorithm to produce at least one long integer value associated with one or more points located on the surface.

Furthermore, computation module may include one or more modules that may interface and communicate with a storage module 222, which may be a repository of geospatial values and/or associated data that may be read from, written to, and utilized by computation module 202 and any component therein. For example, such modules may include an indexing module 218 configured to index the one or more points in an index using the at least one long integer value and/or a querying module configured to query the index according to a user input.

Though such modules discussed above provide examples of modules comprising computation module 202, computation module may include one or more other modules, such as, but not limited to, one or more modules for converting latitude and longitude values to Cartesian coordinates originating at an origin point and/or performing any of the algorithms described below.

For example, computation module 202 may be converted to perform spatial conversion of a point or polygon from latitude and longitude coordinates to three-dimensional Cartesian coordinates using, for example, the following equations:

Let $\theta$ be the latitude, and let $\phi$ be the longitude. Then:

$$x = r \cos \theta \cos \phi$$

$$y = r \cos \theta \sin \phi$$

$$z = r \sin \theta$$

The algorithm may constrain the values to points on the surface of a sphere so that $r=1$ according to the following equations:

$$x = \cos \theta \cos \phi$$

$$y = \cos \theta \sin \phi$$

$$z = \sin \theta$$

Furthermore, based on the above calculations/conversion, computation module 202 may be configured to execute the following algorithm ("Algorithm 1"), which may determine the location of a test point in relation to a great arc of a sphere (e.g. the Earth):

Let points $\vec{B}_1$ and $\vec{B}_2$, be the endpoints of the great arc B of interest. Operations on $\vec{B}_1$ and $\vec{B}_2$ will be conducted in Cartesian (x, y, z) coordinates. Let point $\vec{T}$, be the test point of interest. Operations on $\vec{T}$ will be conducted in Cartesian (x, y, z) coordinates. Let point $\vec{O}$ be the origin at Cartesian coordinates (x, y, z)=(0, 0, 0) and let vector $\vec{B}=\vec{B_2}-\vec{B_1}$. This defines the line segment that is a chord through the sphere corresponding to the great arc. Let vector $\vec{A}=\vec{T}-\vec{O}$. This defines the radius to the test point. Let vector $\vec{C}=\vec{A}\times\vec{B}$, which defines a vector orthogonal (perpendicular) to $\vec{A}$ and $\vec{B}$ that together with $\vec{A}$ and $\vec{B}$ form a complete alternate basis in which to describe the locations of points in three-dimensional space. In the special case for which $\|\vec{C}\|=0$, $\vec{A}$ and $\vec{B}$ are parallel; this indicates that $\vec{B_1}$, $\vec{B_2}$, $\vec{T}$, and $\vec{O}$ are all coplanar so that the test point is coplanar with both the great arc and the origin. For this to occur, the test point must also be beyond the endpoints of the great arc (except in the very special case where the great arc is poorly defined because $\vec{B_1}$ and $\vec{B_2}$ are at exactly opposite points on the sphere).

To determine where $\vec{T}$ is in relation to the great arc defined by $\vec{B_1}$ and $\vec{B_2}$, computation module 202 may find the path from $\vec{B_1}$ to $\vec{T}$ along direction vectors $\vec{A}$, $\vec{B}$, and $\vec{C}$, which may be represented with the equation:

$$\vec{T}-\vec{B_1}=a\vec{A}+b\vec{B}+c\vec{C}$$

where a, b, and c are unknowns. Computation module 202 may solve for these unknowns using standard linear-algebraic techniques. The resulting values of a, b, and c then tell computation module 202 where the test point $\vec{T}$ is relative to the great arc defined by $\vec{B_1}$ and $\vec{B_2}$.

The sign of a tells computation module 202 whether or not $\vec{T}$ is on the same side of the sphere as the great arc defined by $\vec{B_1}$ and $\vec{B_2}$. If a>0, then $\vec{T}$ is on the same side of the sphere as the great arc defined by $\vec{B_1}$ and $\vec{B_2}$. If a<0, then $\vec{T}$ is on the opposite side of the sphere as the great arc defined by $\vec{B_1}$ and $\vec{B_2}$. Further, the sign of b tells computation module 202 where the test point $\vec{T}$ is relative to the endpoints of the great arc. For 0≤b≤1, the point that is on the great circle of the great arc and that is closest to $\vec{T}$ is between the great arc endpoints $\vec{B_1}$ and $\vec{B_2}$; for b<0 or b>1 this great circle point is outside of the great arc endpoints.

Further, the sign of c tells computation module 202 on which side of the great arc the test point $\vec{T}$ is located. For c=0, the test point $\vec{T}$ is on the great circle that contains the great arc of interest. For c>0, the test point $\vec{T}$ is on one side of this great circle; for c<0 the test point $\vec{T}$ is on the other side of the great circle.

Furthermore, computation module 202 may be configured to execute the following algorithm ("Algorithm 2"), which may determine the intersection of two great arcs:

Let points $\vec{A_1C}$ and $\vec{A_2}$, be defined as the endpoints of the great arc A of interest. Operations on $\vec{A_1C}$ and $\vec{A_2C}$ will be conducted in Cartesian (x, y, z) coordinates. Additionally, let points $\vec{B_1}$ and $\vec{B_2}$ be the endpoints of the great arc B of interest. Operations on $\vec{B_1}$ and $\vec{B_2}$ will be conducted in Cartesian (x, y, z) coordinates.

To determine if A and B intersect, computation module 202 finds a radius out from the origin that intersects both the spherical chord between $\vec{A_1C}$ and $\vec{A_2}$ and the spherical chord between $\vec{B_1}$ and $\vec{B_2}$. To find this radius, let vector $\vec{A}=\vec{A_2}-\vec{A_2}$, which defines the line segment that is a chord through the sphere corresponding to the great arc A.

Also, let vector $\vec{B}=\vec{B_2}-\vec{B_1}$. This defines the line segment that is a chord through the sphere corresponding to the great arc B. Thus, the coordinates of the intersection of $\vec{A}$ with the radius when multiplied by a constant scaling factor c will equal the coordinates of the intersection of $\vec{B}$ with the radius. If this scaling factor is non-negative (c≥0), the great arcs intersect; for a negative scaling factor (c<0) the great arcs are on opposite sides of the sphere.

Furthermore, if computation module 202 take $\vec{A_3}$ as the point on $\vec{A}$ that intersects the common radius and $\vec{B_3}$ as the point on $\vec{B}$ that intersects the common radius, then $\vec{B_3}=c\vec{A_3}$. Thus, $\vec{A_3}$ on $\vec{A}$ is located at some fraction a along $\vec{A}$ from $\vec{A_2}$, so $\vec{A_3}=\vec{A_2}+a\vec{A}$. Likewise, $\vec{B_3}$ is some fraction b along $\vec{B}$ from $\vec{B_1}$, so $\vec{B_3}=\vec{B_1}+\vec{B}$. The overall governing equation for Algorithm 2 is then:

$$\vec{B_1}b\vec{B}=c(\vec{A_2}+a\vec{A})$$

which can be rewritten to $$\vec{B_1}c\vec{A_2}+d\vec{A}-b\vec{B}$$

where d=ac and b, c, and d are unknowns. Next, computation module 202 solves for these unknowns using standard linear-algebraic techniques and then compute a from a=d/c. The great arcs A and B intersect for the case where 0≤a≤1, −1≤b≤0, and c≥0 Otherwise the great arcs A and B do not intersect.

In all of the above aspects of Algorithm 2, there is an example degenerate case to consider. That is the case where $\vec{A}$ and $\vec{B}$ are parallel. In this case, computation module 202 may compute the inner product of the vectors from the origin to the midpoints of $\vec{A}$ and $\vec{B}$. If this inner product is 1 (within round-off error), then great arcs A and B overlap in full or in part; otherwise these great arcs are side-by-side or on opposite sides of the sphere.

Furthermore, computation module 202 may be configured to execute the following algorithm ("Algorithm 3"), which may determine the angle tangential to the surface of a sphere subtended by a great arc as viewed from a test point:

Let points $\vec{B_1}$ and $\vec{B_2}$, be the endpoints of the great arc B of interest. Operations on $\vec{B_1}$ and $\vec{B_2}$ will be conducted in Cartesian (x, y, z) coordinates. Let point $\vec{T}$, be the test point of interest. Operations on $\vec{T}$ will be conducted in Cartesian (x, y, z) coordinates. Let point $\vec{O}$ be the origin at Cartesian coordinates (x, y, z)=(0, 0, 0). The normal vector $\vec{N_1}$ of the plane $\overline{P_1}$ containing $\vec{B_1}$, $\vec{T}$, and $\vec{O}$ is given by $\vec{N_1}=\vec{B_1}\times\vec{T}$. The normal vector $\vec{N_2}$ of the plane $\overline{P_1}$ containing $\vec{B_2}$, $\vec{T}$, and $\vec{O}$ is given by $\vec{N_2}=\vec{B_2}\times\vec{T}$. Furthermore, let $\vec{C}=\vec{N_1}\times\vec{N_2}$.

The magnitude of the angle subtended by B as viewed from $\vec{T}$ is then given by $$\sin^{-1}\left(\frac{\|\vec{C}\|}{\|\vec{N_1}\|\|\vec{N_2}\|}\right),$$

combined with the sign of $\vec{N_1}\cdot\vec{N_2}$. In other words, computation module 202 may also be configured to determine whether an angle is acute or obtuse when calculating the angle by computing the dot product $\vec{N_1}\cdot\vec{N_2}$ and analyzing the sign of the angle. For example, where the dot product is positive, the computation module 202 may determine that the angle is acute, where the dot product is equal the angle is a right angle, and where the dot product is negative the angle is obtuse.

Whether or not a point $\vec{T}$ is within a polygon defined by a set of bounding great arcs B can be determined by computation module 202 by summing the angles given by this algorithm over all of the bounding great arcs B.

Furthermore, computation module 202 may be configured to execute the following algorithm ("Algorithm 4"), which may determine whether a great arc crosses an area of the spherical surface delimited by a minimum and maximum latitude and by a minimum and maximum longitude (e.g. as provided in a query, for example, by a user):

Let points $\vec{B_1}$ and $\vec{B_2}$ be the endpoints of the great arc B of interest with latitudes $\theta_1$ and $\theta_2$ and longitudes $\phi_1$ and $\phi_2$. Let S be an area of the spherical surface defined by minimum and maximum latitudes $\theta_{min}$ and $\phi_{max}$ and by minimum and maximum longitudes $\phi_{min}$ and $\phi_{max}$.

Computation module may be configured to determine the following:

If $\theta_1<\theta_{min}$ and $\theta_2<\theta_{min}$, then B does not cross S.
If $\theta_1>\theta_{max}$ and $\theta_2>\theta_{max}$, then B does not cross S.
If $\phi_1<\phi_{min}$ and $\phi_2<\phi_{min}$, then B does not cross S.
If $\phi_1>\phi_{max}$ and $\phi_2>\phi_{max}$, then B does not cross S.

If none of these conditions are satisfied, computation module 202 may execute Algorithm 1 to determine the locations of the corners $(\theta_{min},\phi_{min})$, $(\theta_{min},\phi_{max})$, $(\theta_{max},\phi_{max})$, and $(\theta_{max},\phi_{min})$ relative to B. Further, computation module 202 may be configured to determine that B crosses S if at least one corner is on each side of B, otherwise B does not cross S.

Furthermore, computation module 202 may be configured to execute the following algorithm ("Algorithm 5"), which may determine whether one subject polygon overlaps another:

Computation module 202 may execute Algorithm 3 to determine if the any vertices of the first polygon are contained within the bounding great arcs of the second polygon or if any vertices of the second polygon are contained within the bounding great arcs of the first polygon. If any vertex of one polygon is contained within the bounding great arcs of the other polygon, then the polygons overlap.

Otherwise, computation module may execute Algorithm 2 on all pairs of bounding great arcs in which one bounding great arc is drawn from each polygon. If any intersections are found, then the polygons overlap. Otherwise computation module 202 may determine that the polygons do not overlap.

Furthermore, computation module 202 may be configured to execute the following algorithm ("Algorithm 6"), which may generate a set of areas of a spherical surface (e.g. the surface of the Earth) delimited by a minimum and maximum latitude and by a minimum and maximum longitude that cover a given polygon (e.g. as submitted in a query to geospatial search engine 104 by a user, for example):

Let S be an area of the spherical surface defined by minimum and maximum latitudes $\theta_{min}$ and $\theta_{max}$ and by minimum and maximum longitudes $\phi_{min}$ and $\phi_{max}$. If all vertices of the polygon have latitudes between $\theta_{min}$ and $\theta_{max}$ and longitudes between $\phi_{min}$ and $\phi_{max}$, or if Algorithm 4 finds that any bounding great arc of the polygon crosses this area S, then computation module 202 may repeat Algorithm 6 with the four new areas generated by dividing both the latitude and longitude ranges of S at their midpoints unless we've reached a maximum number of subdivision levels. If the computation module has reached the maximum number of subdivision levels, then record S as a part of the polygon.

Otherwise, computation module may use Algorithm 3 to determine if the point given by the midpoint of the latitude range for S and the midpoint of the longitude range for S is in the given polygon. If this point is in the polygon, then computation module 202 may record S as a part of the polygon. Otherwise, the computation module 202 may not record S as a part of the polygon.

Furthermore, computation module 202 may be configured to execute the following algorithm ("Algorithm 7"), which may generate a set of areas of the spherical surface that cover a given polygon:

The computation module 202 may execute Algorithm 6 for the area from Latitude 90 South to the Equator and from Longitude 180 West to Longitude 90 West. Further, computation module 202 may execute Algorithm 6 for the area from Latitude 90 South to the Equator and from Longitude 90 West to the Prime Meridian (Longitude 0). Moreover, computation module 202 may execute Algorithm 6 for the area from the Equator to Longitude 90 North and from Longitude 180 West to Longitude 90 West, may execute Algorithm 6 for the area from the Equator to Longitude 90 North and from Longitude 90 West to the Prime Meridian (Longitude 0), for the area from Latitude 90 South to the Equator and from the Prime Meridian (Longitude 0) to Longitude 90 East, and for the area from Latitude 90 South to the Equator and from Longitude 90 East to Longitude 180 East.

Furthermore, computation module 202 may execute Algorithm 6 for the area from the Equator to Longitude 90 North and from Prime Meridian (Longitude 0) to Longitude 90 East, and/or for the area from the Equator to Longitude 90 North and from Longitude 90 East to Longitude 180 East.

In addition, the computation module 202 may be configured to gather the areas S that covered the polygon as determined by the above executions of Algorithm 6 and report the identifiers of these areas, for example, to a user via computer device 102. Computation module 202 may be configured to use these identifiers for indexing the given polygon and converting the polygon into values which can be used to search an index. In the latter case or a search, computation module 202 may execute Algorithm 5 to filter the polygons returned from the index to only those which actually overlap the polygon given in the search query.

Figure 3:
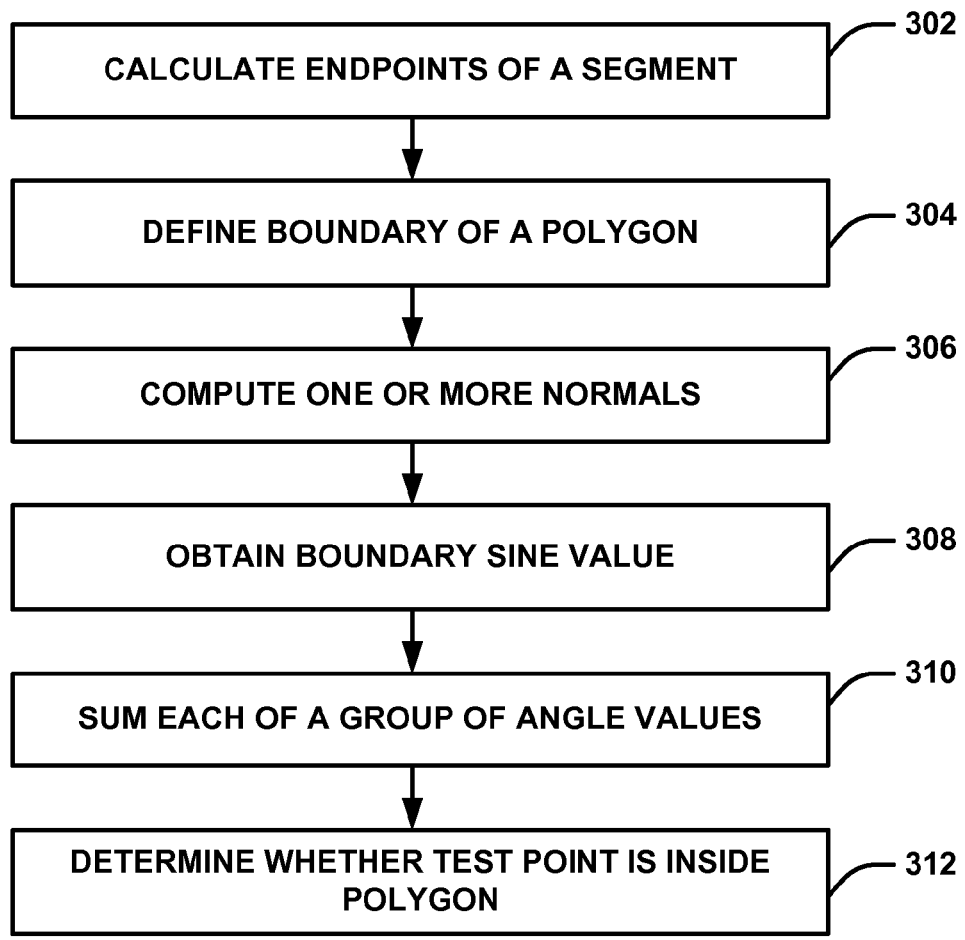
FIG. 3 is a flowchart illustrating a method for improved geospatial search, according to an example embodiment.

FIG. 3 illustrates an example method 300 for improved geospatial searching based on three-dimensional Cartesian coordinates according to aspects of the present disclosure. In some aspects, method 300 may include obtaining one or more search parameters of a search query from a user or a computer device, searching for a document based on the search query, converting one or more locational values into three-dimensional Cartesian coordinates, and/or indexing one or more numerical values that may correspond to one or more points or areas of a surface (not shown). In addition, example method may include computing one or more of Algorithms 1-7, as defined in reference to FIG. 2, or any other algorithms defined herein or known to those of skill in the art.

Furthermore, as illustrated in FIG. 3, alternatively or in addition to methods mentioned above, method 300 may include, at block 302, calculating endpoints of a segment, wherein the endpoints are specified in Cartesian coordinates and are located on a substantially spherical surface. Furthermore, method 300 may include, at block 304, defining a boundary of a polygon according to the segment. In addition, method 300 may include computing, at block 306, one or more normals corresponding to one or more planes, wherein each of the one or more planes contain a test point and a boundary point associated with the boundary Additionally, method 300 may include, at block 308, obtaining a boundary sine value of an angle defined by an arc subtended by the endpoints. Furthermore, at block 310, method 300 may include summing each of a group of angle values derived from the boundary sine value to obtain an angle sum, wherein the group contains the boundary sine value. Moreover, example method 300 may further include determining, at block 312, whether the test point is inside the polygon based on the angle sum.

In some examples, method 300 may further include one or more of: modifying a geohash algorithm to produce at least one long integer value associated with one or more points located on the surface, indexing the one or more points in an index using the at least one long integer value, querying the index according to a user input, receiving a query from a computer device or a user, and/or reporting a search query result to a user or computer device.

Figure 4:
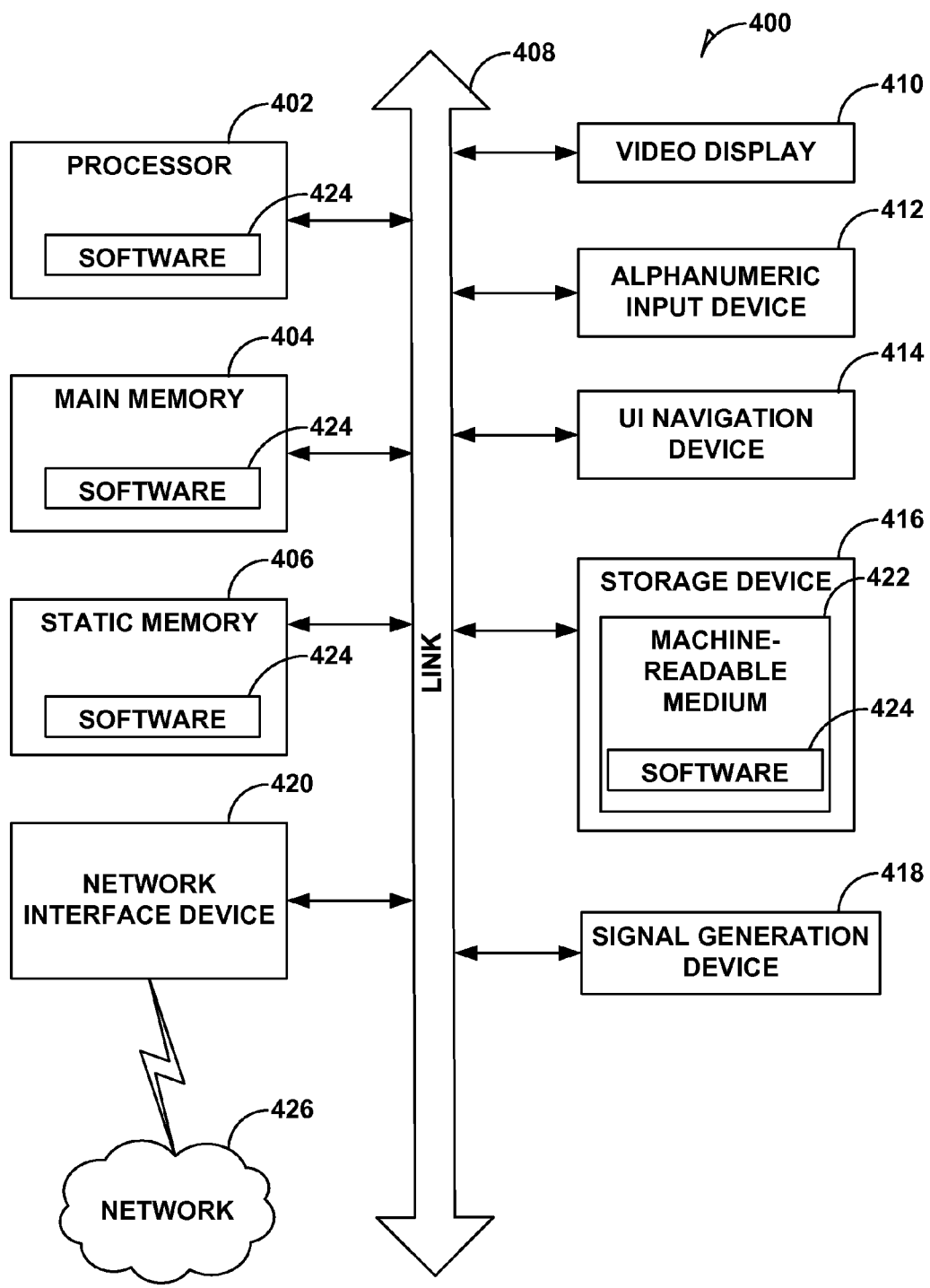
FIG. 4 is a block diagram illustrating a machine in the example form of a computer system, within which a set or sequence of instructions for causing the machine to perform any one of the methodologies discussed herein may be executed, according to an example embodiment.

FIG. 4 is a block diagram illustrating a machine in the example form of a computer system 500 (e.g. computer device 102 and/or geospatial search database 104 of FIG. 1), within which a set or sequence of instructions for causing the machine to perform any one of the methodologies discussed herein may be executed, according to an example embodiment. In alternative embodiments, the machine operates as a standalone device or may be connected (e.g. networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 400 includes at least one processor 402 (e.g. a central processing unit (CPU), a graphics processing unit (GPU) or both, processor cores, compute nodes, etc.), a main memory 404 and a static memory 404, which communicate with each other via a link 408 (e.g. bus). The computer system 400 may further include a video display unit 410, an alphanumeric input device 412 (e.g. a keyboard), and a user interface (UI) navigation device 414 (e.g. a mouse). In one embodiment, the video display unit 410, input device 412 and UI navigation device 414 are incorporated into a touch screen display. The computer system 400 may additionally include a storage device 414 (e.g. a drive unit), a signal generation device 418 (e.g. a speaker), a network interface device 420, and one or more sensors (not shown), such as a global positioning system (GPS) sensor, compass, accelerometer, or other sensor.

The storage device 414 includes a machine-readable medium 422 on which is stored one or more sets of data structures and instructions 424 (e.g. software) embodying or utilized by any one or more of the methodologies or functions described herein. The instructions 424 may also reside, completely or at least partially, within the main memory 404, static memory 404, and/or within the processor 402 during execution thereof by the computer system 400, with the main memory 404, static memory 404, and the processor 402 also constituting machine-readable media.

While the machine-readable medium 422 is illustrated in an example embodiment to be a single medium, the term "machine-readable medium" may include a single medium or multiple media (e.g. a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g. Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g. HTTP). Examples of communication networks include a local area network (LAN), a wide area network (WAN), the Internet, mobile telephone networks, Plain Old Telephone (POTS) networks, and wireless data networks (e.g. Wi-Fi, 3 G, and 4 G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of modules, modules, or mechanisms. Modules are tangible entities capable of performing specified operations and may be configured or arranged in a certain manner. In an example, circuits may be arranged (e.g. internally or with respect to external entities such as other circuits) in a specified manner as a module. In an example, the whole or part of one or more computer systems (e.g. a standalone, client or server computer system) or one or more hardware processors may be configured by firmware or software (e.g. instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the terms "module" and "module" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which modules are temporarily configured, one instantiation of a module may not exist simultaneously with another instantiation of the same or different module. For example, where the modules comprise a general-purpose hardware processor configured using software, the general-purpose hardware processor may be configured as respective different modules at different times. Accordingly, software may configure a hardware processor, for example, to constitute a particular module at one instance of time and to constitute a different module at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the system may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for geospatial indexing, comprising:
an endpoint calculating module configured to calculate endpoints of a segment, wherein the endpoints are specified in Cartesian coordinates and are located on a substantially spherical surface;
a boundary defining module configured to define a boundary of a polygon according to the segment;
a normal computing module configured to compute one or more normals corresponding to one or more planes, wherein each of the one or more planes contain a test point and a boundary point associated with the boundary;
a sine obtaining module configured to obtain a boundary sine value of an angle defined by an arc subtended by the endpoints;
a summing module configured to sum each of a group of angle values derived from the boundary sine value to obtain an angle sum, wherein the group contains the boundary sine value;
a location determining module configured to determine whether the test point is inside the polygon based on the angle sum;
an algorithm modifying module configured to modify a geohash algorithm to produce at least one long integer value associated with one or more points located on the surface; and
an indexing module configured to index the one or more points in an index using the at least one long integer value.

2. The apparatus of claim 1, wherein the one or more points include at least one of the test point and the endpoints.

3. The apparatus of claim 1, further comprising a querying module configured to query the index according to a user input.

4. The apparatus of claim 3, wherein the user input comprises a polygon.

5. The apparatus of claim 4, wherein the polygon comprises at least one of a circle, a rectangle, a square, and an ellipse.

6. The apparatus of claim 5, wherein defining the boundary of the polygon further comprises computing one or more cross-products.

7. A method of geospatial indexing, comprising:
calculating endpoints of a segment, wherein the endpoints are specified in Cartesian coordinates and are located on a substantially spherical surface;
defining a boundary of a polygon according to the segment;
computing one or more normals corresponding to one or more planes, wherein each of the one or more planes contain a test point and a boundary point associated with the boundary;
obtaining a boundary sine value of an angle defined by an arc subtended by the endpoints;
summing each of a group of angle values derived from the boundary sine value to obtain an angle sum, wherein the group contains the boundary sine value;
determining whether the test point is inside the polygon based on the angle sum:
modifying a geohash algorithm to produce at least one long integer value associated with one or more points located on the surface; and
indexing the one or more points in an index using the at least one long integer value.

8. The method of claim 7, wherein the one or more points include at least one of the test point and the endpoints.

9. The method of claim 7, further comprising querying the index according to a user input.

10. The method of claim 9, wherein the user input comprises a polygon.

11. The method of claim 10, wherein the polygon comprises at least one of a circle, a rectangle, a square, and an ellipse.

12. The method of claim 11, wherein defining the boundary of the polygon further comprises computing one or more cross-products.

13. At least one non-transitory machine readable medium comprising a plurality of instructions that in response to being executed on a computing device, cause the computing device to:
calculate endpoints of a segment, wherein the endpoints are specified in Cartesian coordinates and are located on a substantially spherical surface;

define a boundary of a polygon according to the segment;
compute one or more normals corresponding to one or more planes, wherein each of the one or more planes contain a test point and a boundary point associated with the boundary;
obtain a boundary sine value of an angle defined by an arc subtended by the endpoints;
sum each of a group of angle values derived from the boundary sine value to obtain an angle sum, wherein the group contains the boundary sine value; and
determine whether the test point is inside the polygon based on the angle sum;
modify a geohash algorithm to produce at least one long integer value associated with one or more points located on the surface; and
index the one or more points in an index using the at least one long integer value.

14. The at least one non-transitory machine readable medium of claim 13, wherein the one or more points include at least one of the test point and the endpoints.

15. The at least one non-transitory machine readable medium of claim 13, further comprising a plurality of instructions that in response to being executed on the computing device, further cause the computing device to query the index according to a user input.

16. The at least one non-transitory machine readable medium of claim 13, wherein the user input comprises a polygon.

17. The at least one non-transitory machine readable medium of claim 16, wherein the polygon comprises at least one of a circle, a rectangle, a square, and an ellipse.

* * * * *